United States Patent

Smith et al.

[11] Patent Number: 5,663,791
[45] Date of Patent: Sep. 2, 1997

[54] APPARATUS AND METHOD FOR TESTING ELASTIC ARTICLES

[75] Inventors: Stephen R. Smith, Lawrenceville; John L. Lowrance, Princeton, both of N.J.

[73] Assignee: Princeton Scientific Instruments, Inc., Monmouth Junction, N.J.

[21] Appl. No.: 609,293

[22] Filed: Mar. 1, 1996

[51] Int. Cl.$^6$ ................................................ G01N 21/00
[52] U.S. Cl. .......................... 356/237; 356/429; 356/430
[58] Field of Search ................................. 356/237, 429, 356/430, 394, 238

[56] References Cited

U.S. PATENT DOCUMENTS

| | | | |
|---|---|---|---|
| 3,065,615 | 11/1962 | Abrams | 356/238 |
| 3,659,950 | 5/1972 | Troll et al. | 356/238 |
| 3,826,923 | 7/1974 | Trimble | 356/237 |

*Primary Examiner*—Frank G. Font
*Assistant Examiner*—Reginald H. Ratliff
*Attorney, Agent, or Firm*—Henry I. Schanzer

[57] ABSTRACT

Apparatus and method for optically testing products such as condoms, gloves or any number of similar objects without contact and non-destructively. In testing for holes, a light source having a wavelength at which the product to be tested is relatively opaque is used to illuminate either the inner or outer wall of the product and a photo sensor sensitive to the particular wavelength is located to sense the amount of light passing through the wall of the product. In testing for embedded particles, a light source of visible light is used to illuminate the product to be tested and a photosensor senses any variation in the amount of light passing through the walls of the product.

In the testing of products, such as condoms, for the presence of holes, the condom is mounted on a transparent mandrel or distended by inflating the condom with a jet of air. A line of light derived from a light source having a wavelength at which the condom material, if free of defects, is relatively opaque, is projected onto the surface of the condom and a photosensor measures the amount of light passing through the surface of the condom. The light may be scanned about the surface of the condom while the condom is stationary. Alternatively, the line of light is stationary and the condom is rotated about the light. The photo sensor is positioned to sense the amount of light passing through the condom wall along a line corresponding to the line of light for determining the presence of a defect and its location.

36 Claims, 21 Drawing Sheets

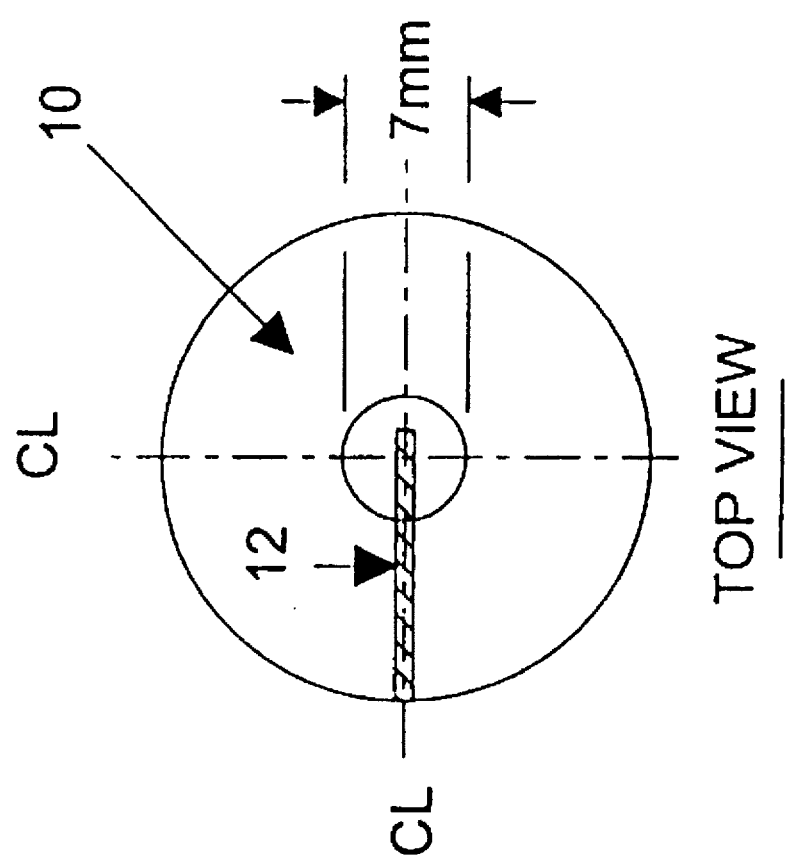

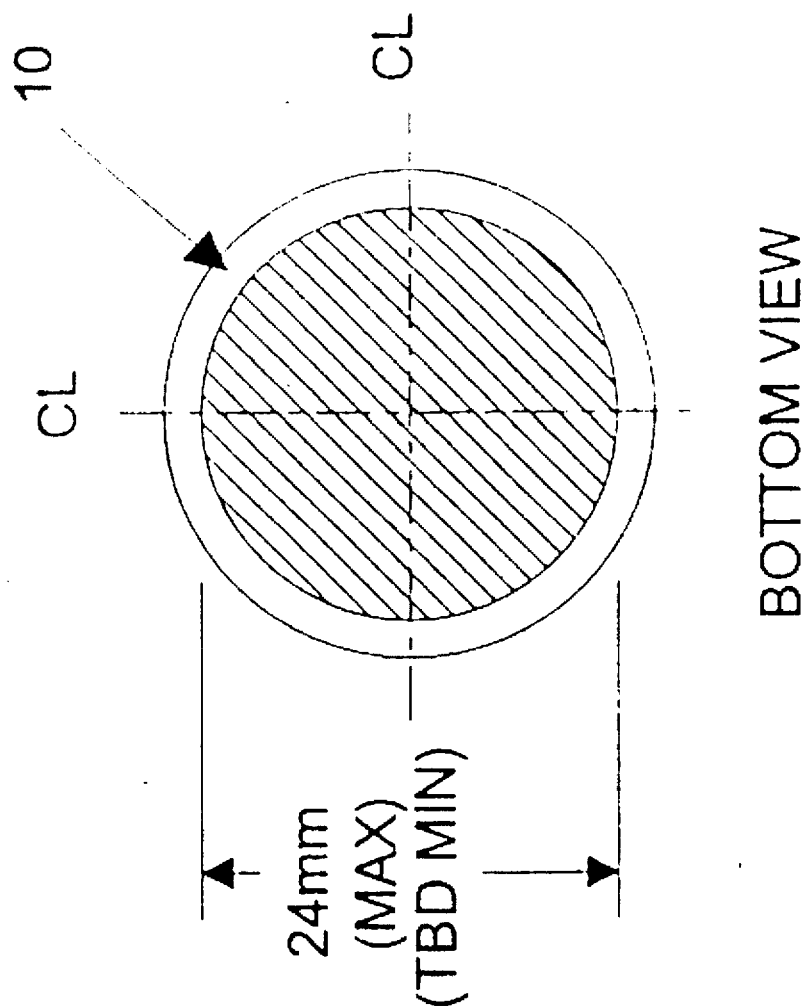

APPARATUS AND METHOD FOR TESTING ELASTIC ARTICLES

This invention was made with government support under FDA Grant No. 2 R44 FD 01479-02 from the Department of Health and Human Services SBIR. The government has certain rights in this invention.

BACKGROUND OF THE INVENTION

This invention relates to apparatus and method for inspecting elastic products such as condoms and, in particular, to electro-optical means for detecting the presence of holes and related defects in these products and for determining the thickness of the products.

In the discussion to follow condoms are used to illustrate problems encountered and solved by the invention and its application. However, it should be understood that condoms are used by way of example and that any number of related products (e.g., surgical gloves) made of similar substances to the condoms may be tested electro-optically in accordance with the invention.

It is essential to determine the integrity of condoms because condoms are used to prevent the transmission of body fluids during sexual intercourse and other activity. Also, the use of condoms is intended to prevent the transmission of the AIDS virus and other bio-hazards by blocking physical contact with blood and other body fluids. This fact places special importance on the integrity of the barrier afforded by condoms against microscopic viruses and bacteria. It is therefore extremely important to ensure that there are no holes and like defects in the condoms.

The problem of determining the size and location of holes may be best understood by noting that a latex condom is made by dipping a mold (mandrel) into liquid latex and then passing the latex-coated mold through a curing oven. The condom is then removed from the mold and coated with a powder to prevent stickiness of the surface. A known method for "electrically" testing the integrity of a condom includes mounting the condom onto a metal mandrel and dipping the mandrel covered by the condom into an electrically conducting liquid (bath). Electrical apparatus measures the current flow between the metal mandrel and the electrically conductive liquid. If the current flow is above a preselected threshold current setting, the condom is assumed to have one or more pinholes which allow the electrically conducting liquid to reach the metal electrode. The condom is then identified as being defective and is rejected. After the electrical test, each condom passing the electric conductivity test is removed from the metal mandrel and packaged.

The presently known electrical conducting liquid test which is equivalent to a resistance measurement is a go-no-go test that does not provide information on the size, number or location of the holes. The effectiveness of the electrical resistance measurement is questionable because of the uncertainty of the minimum size pinhole that can be detected with such instrumentation and the effect of air bubbles and lubricating powder that may block the flow of conductive liquid into the pinhole. In addition, this test also does not give information regarding the thickness of the condom being tested.

Furthermore, the conductive liquid ("bath") test requires the immersion of a condom into a liquid whose conductivity has to be controlled and which may affect the condom material. Subsequently, the condom has to be "dried". Thus, the "bath" test requires substantial handling and care. Where it is desirable and/or required that condoms (or like substances) undergo a 100% in-line inspection, a more effective testing of the condoms is desired.

It is an object of the invention to enable optical inspection of condoms which can be incorporated in a production line.

It is a further object of the invention to have inspection equipment which can, in addition to detecting defective condoms, provide data on the size and location of defects, and on the thickness of the condom and on variations in the thickness of the condom. Such equipment may be used to aid in correcting the manufacturing process and thereby reduce the number of defective condoms manufactured.

SUMMARY OF THE INVENTION

Applicants' invention resides in apparatus for optically testing products such as condoms, gloves or any number of similar objects without contact and non-destructively.

Applicants' invention resides, in part, in the recognition that while certain products are opaque to light at particular wavelengths, defects such as pinholes present in these products are transparent to the light at those particular wavelengths. Applicants' invention thus resides, in part, in the recognition that a light source of a particular wavelength may be used to illuminate either the inner or outer surface of a product and that a photo sensor sensitive to the particular wavelength may be used to sense the amount of light passing through the product.

Applicants' invention includes various means for distending a condom (e.g., a mandrel, or a jet of air), various means for projecting a light source, having a selected wavelength, onto the inner or outer surface of the condom, and various photosensing means for sensing the amount of light passing through the walls of the condom and the location of a defect.

Applicants' invention also resides in apparatus for generating a line source of light for illuminating a surface of a condom to be tested and a photosensor for measuring the amount of light passing through the surface of the condom. Where the condom is made of a material which is relatively opaque at particular wavelengths, the line source of light is selected to have a wavelength at which the condom material, if free of defects, is relatively opaque.

Applicants' invention also resides in projecting a line of light along the length of the condom and for the photosensor to sense the amount of light passing through the condom along a line corresponding to the line of light for determining the location of a defect.

In one embodiment, Applicants' invention includes the use of a transparent mandrel over which a condom to be tested is mounted, where the transparent mandrel is selected to be transparent in the ultraviolet region of the spectrum where latex (or some similar material) is relatively opaque.

Applicants recognized that illuminating a condom with ultraviolet light enables the detection of pinholes which appear as bright points of light against a dark background. The proposed optical inspection technique takes advantage of the opacity of the condom material in the ultraviolet to significantly enhance the optical contrast of the material with tiny pinholes when compared with contiguous material having no pinholes.

Applicants' invention also resides in the recognition that the condom can be tested with light of different wavelengths to test different properties of the condom. Thus condoms may be tested with a light source having a wavelength at which the condom passes a certain amount of the light to enable the measurement of its thickness.

BRIEF DESCRIPTION OF THE DRAWINGS

In the accompanying figures like reference characters denote like components.

FIG. 11A, 11B and 11C are respectively a side view, a top view, and a bottom view of a fiber optic light probe arrangement located within a glass mandrel for producing a line source of light within the mandrel in accordance with the invention;

DETAILED DESCRIPTION OF THE INVENTION

Figure 1:
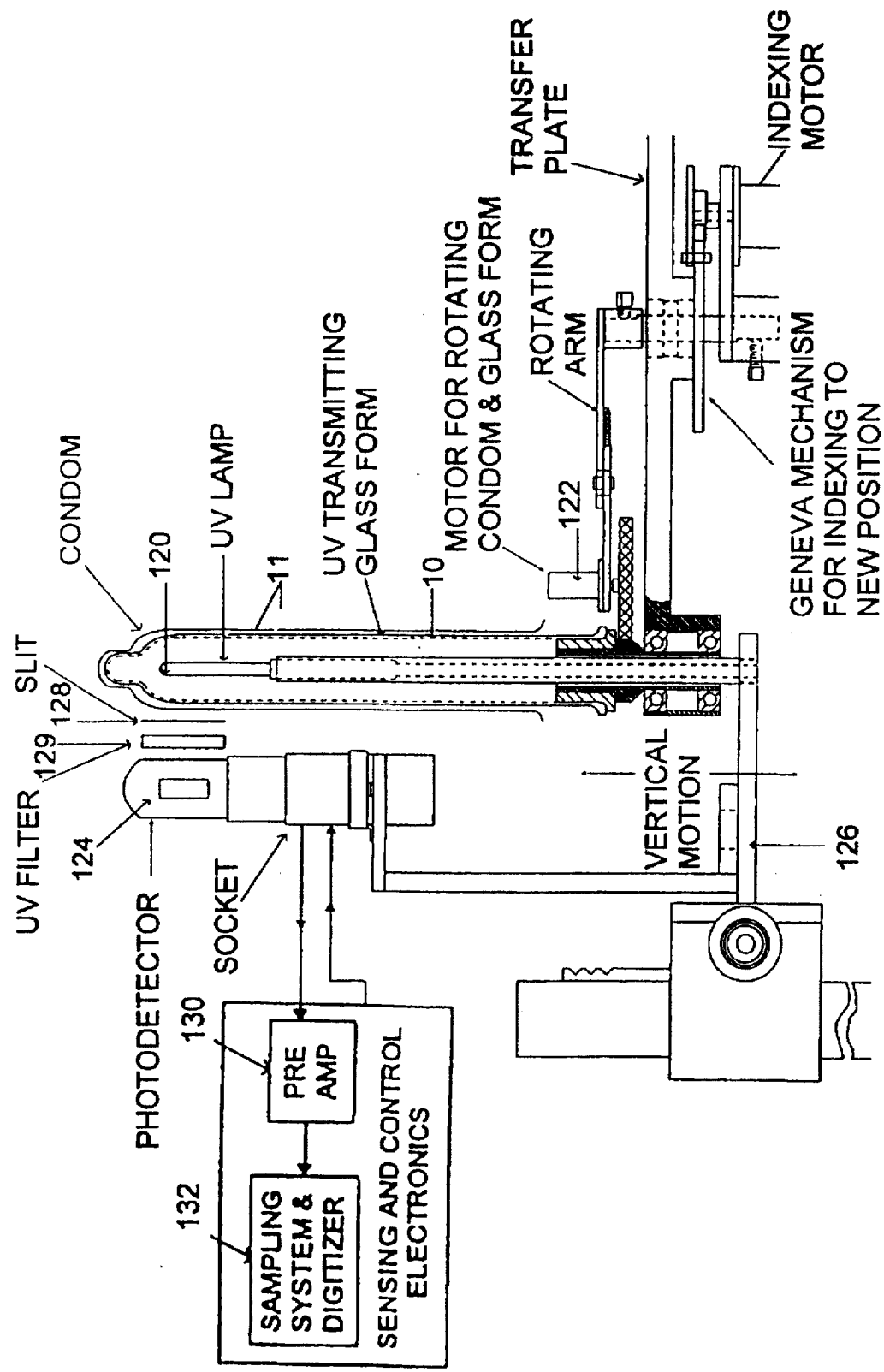
FIG. 1 is a view of a condom testing assembly embodying the invention.

Apparatus and methods embodying Applicants' invention may be better understood and appreciated by first noting certain discoveries and observations made by Applicants.

Condoms are normally manufactured from a latex substance which is translucent in visible light. In visible light, a microscopic pinhole in such translucent material does not appear significantly brighter than the surrounding material. However, latex is relatively opaque to ultraviolet light and pinholes back lit with ultraviolet light appear as unresolved points of light against a dark background. Applicants conducted experiments to obtain data on the optical transmission of latex as a function of wavelength and made measurements to confirm that latex was sufficiently opaque in the ultraviolet for the proposed measurement technique to work. Applicants recognized that the situation can be compared to the visibility of stars in the sky. At night the stars are clearly visible as points of light, but the stars become invisible against the morning sky as scattered sunlight increases the brightness of the background around the stars.

Applicants concentrated their work on pinhole detection using ultraviolet illumination of latex condoms and also using detector systems that do not require optically resolving the microscopic pinhole images. This latter factor greatly reduces the information bandwidth requirements for detection and consequently minimizes the time required to do the inspection.

Both ultraviolet and infrared wavelengths were investigated for measuring the relative thickness of the condom wall as a function of position, both axially and circumferentially.

The surface area of a condom is approximately 200 sq.cm. This surface must be searched for defects/pinholes very quickly (in less than a few seconds) in order to fit current condom production rates.

In considering optical detection of pinholes, it must be noted that the contiguous material is not completely opaque even in ultraviolet light. Therefore, restricting the field of view of the optical system improves the contrast of tiny pinholes against the background. A small field of view, in turn, lengthens the time required to scan over the 200 sq.cm. surface area.

Let "a" be the area of a pinhole and "A" the area of the surrounding area being viewed. The contrast between an area containing a pinhole and an area of equal size free of pinholes is given by the ratio:

$$Contrast=(AT+a)/AT=1+a/AT$$

where T is the optical transmission of the material, in this case latex. It is clear that the product AT must be small compared to a. For a contrast of 2:1, a=AT, i.e., the amount of light exiting the pinhole equals the light transmitted through the surrounding area viewed by the optics. While a 2:1 contrast ratio is not a necessary criteria for detecting a pinhole, it will be used in the following example to illustrate the problem.

Assume a 10 micron diameter pinhole, approximately 60 sq. microns in area, and assume that the detector field of view is 1 square centimeter. In this case, the latex transmission T must be less than 6x10E-7 in order for the contrast ratio to be 2:1 or greater. The field of view may be restricted at the expense of increasing the time required to inspect the condom. However, the inspection time may then be shortened by employing a number of detectors working in parallel.

Latex, the substance used to manufacture the condoms under investigation, is relatively opaque in the ultraviolet and such low transmission (opacity) exists for light having a wavelength below 300 nm.

Returning to the question of the contrast required for pinhole detectability, in the limit the signal related to the light from the pinhole needs to be detectable against the noise background. This noise background can have three components, the electronic noise of the instrument, the statistical fluctuation in the background light transmitted by the latex, referred to as "shot noise" and variations in the background light due to spatial variations in the transmission of the latex. In practice, Applicants recognized that variations in optical transmission produce the dominant noise in the detector signal.

Applicants further recognized that there was a significant advantage in making the integrated flux incident on the area large, and the material opaque by working at a wavelength of light where the transmission is very low. In the case of latex, this is the ultraviolet.

FIG. 1 is a diagram of a test fixture and instrumentation for detecting and measuring the relative size of pinholes in condoms. An ultraviolet lamp 120 is mounted inside a glass mandrel 10 to back-illuminate a condom 11 mounted on the mandrel. The mandrel 10 is rotated via a motor driven belt drive assembly 122. The rotating condom is viewed by a photomultiplier tube 124. The field of view of the photomultiplier is limited by a slit 128 and an ultraviolet bandpass filter 129 positioned between the photodetector 124 and the condom/mandrel assembly to narrow the spectral response of the photomultiplier. Thus, as shown in FIG. 1, wavelength-isolating filters 129 may be placed outside the mandrel 10 and condom 11, behind which is located a UV-sensitive photomultiplier tube (PMT) 124. PMT 124 offers not only high sensitivity, but also the ability to vary its amplification over several orders of magnitude by changing the high voltage applied to its dynode string. The anode signal from PMT 124 may be passed through a simple preamplifier 130 and into a sampling system 132 which digitizes the signal to an accuracy of, for example, 5 millivolts and which is operated, for example, at a sampling rate of 10 kHz. The light source and photomultiplier may be selectively moved vertically, in synchronism, relative to the condom by a mechanical assembly 126 to scan different portions of the condom. Rotating the mandrel 10 via assembly 122, and raising and lowering the mandrell vertically via assembly 126, enables the entire surface of the condom to be illuminated and viewed for determining the location of a detected defect.

Successful detection of small pinholes in a condom requires the optical transmission of the thin material from which the condom is made to be extremely low. This condition is necessary in order that a signal reaching the detector due to a pinhole not be swamped by a signal transmitted diffusely through the condom material. A hole of 10 micrometers diameter constitutes less than a hundred-millionth of the approximately 200 square centimeter total area of a typical condom. In order to address this point, apparatus embodying the invention may include an optical detection system which has an instantaneous field of view (FOV) of only a few square millimeters. The FOV is scanned mechanically across the surface of a condom in the search for pinhole defects. When, for example, a full rotation of a mandrel occurs in 100 milliseconds, the condom moves across the FOV at a speed of approximately 1 millimeter per millisecond and with a sampling rate of 10 KHZ, there will be 10 samples for each millimeter.

A four (4) square millimeter FOV, however, still has 50,000 times the area of a 10 micrometer hole. The condom must then attenuate the optical beam by a comparable or greater factor in order to produce an acceptable signal to noise (S/N) ratio for pinhole detection.

At visible wavelengths, condom walls appear translucent, and typically transmit over 10% of incident light. As the wavelength of the incident radiation is decreased into the ultraviolet, however, the condom material transmits a smaller fraction of the light. At a wavelength of 300 nm, the transmission of a typical latex layer is approximately 0.01%. At 254 nm, Applicants determined it to be no more than 1 part in 200,000.

In the scanning system shown in FIG. 1, a fixed UV light source 120 was placed inside a UV-transmitting mandrel 10 made of fused silica (quartz) but otherwise similar to the mandrel used to form the condom. In practice, mandrels which are dipped into a latex bath to form condoms may not be transparent to UV light. However, as discussed below, it may be advisable to use mandrels which are transparent to UV light in order to enable testing to be conducted on the condoms as they are being formed.

A condom 11 may be fitted over the mandrel 10, which is then rotated in front of the photodetector 124 by a simple motor drive assembly 122 on which it is placed. The time evolution of the PMT 124 signal then follows the variation in light transmitted through the condom as the FOV passes repetitively around its circumference. A pinhole produces a signal analogous to that of a light house beacon, superimposed in principle on a more slowly varying signal produced by light which may be transmitted diffusely through the condom wall.

Figure 12:
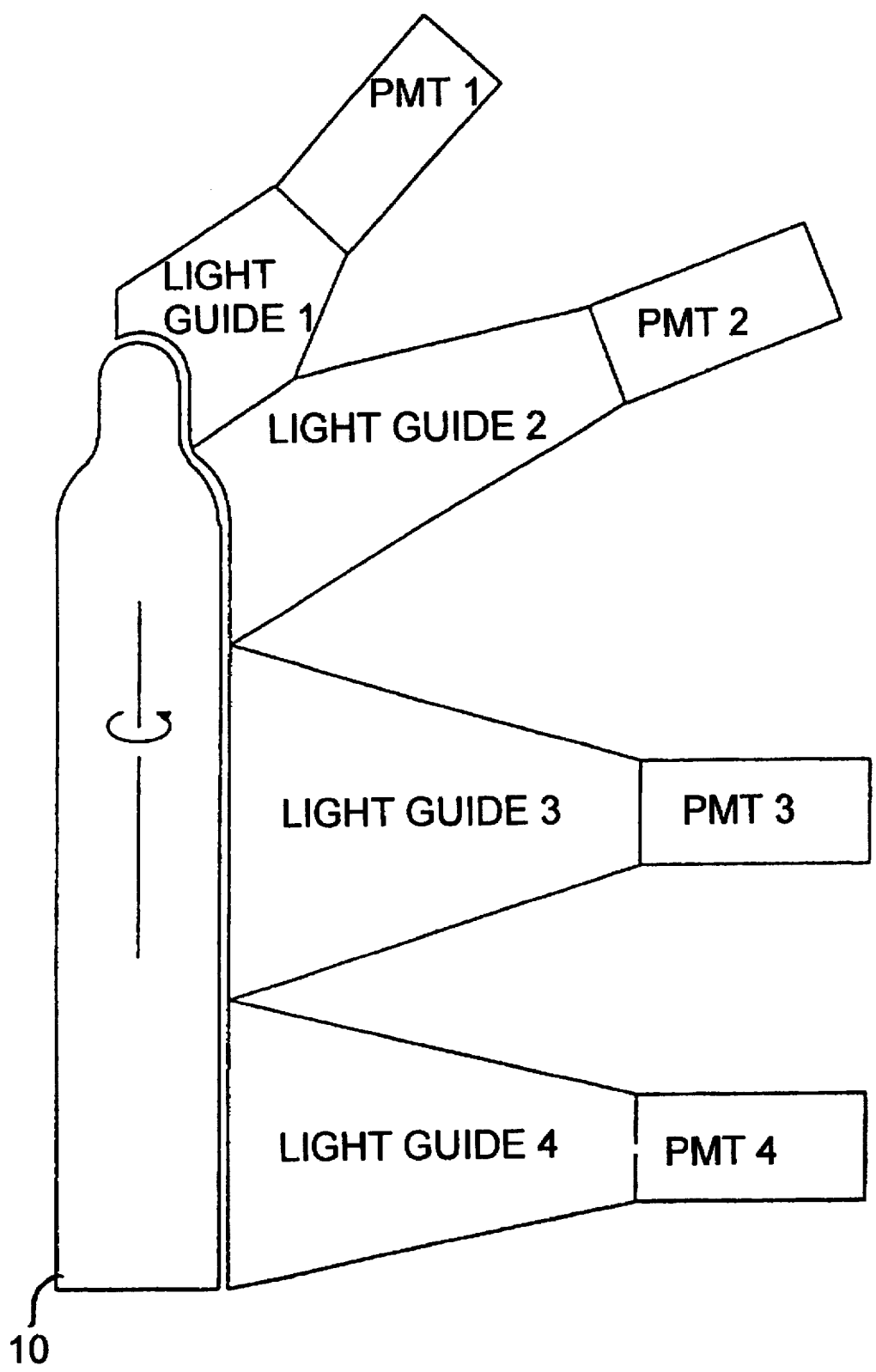
FIG. 12 is a simplified front view of a photodetector configuration for use in systems embodying the invention.
Figure 13:
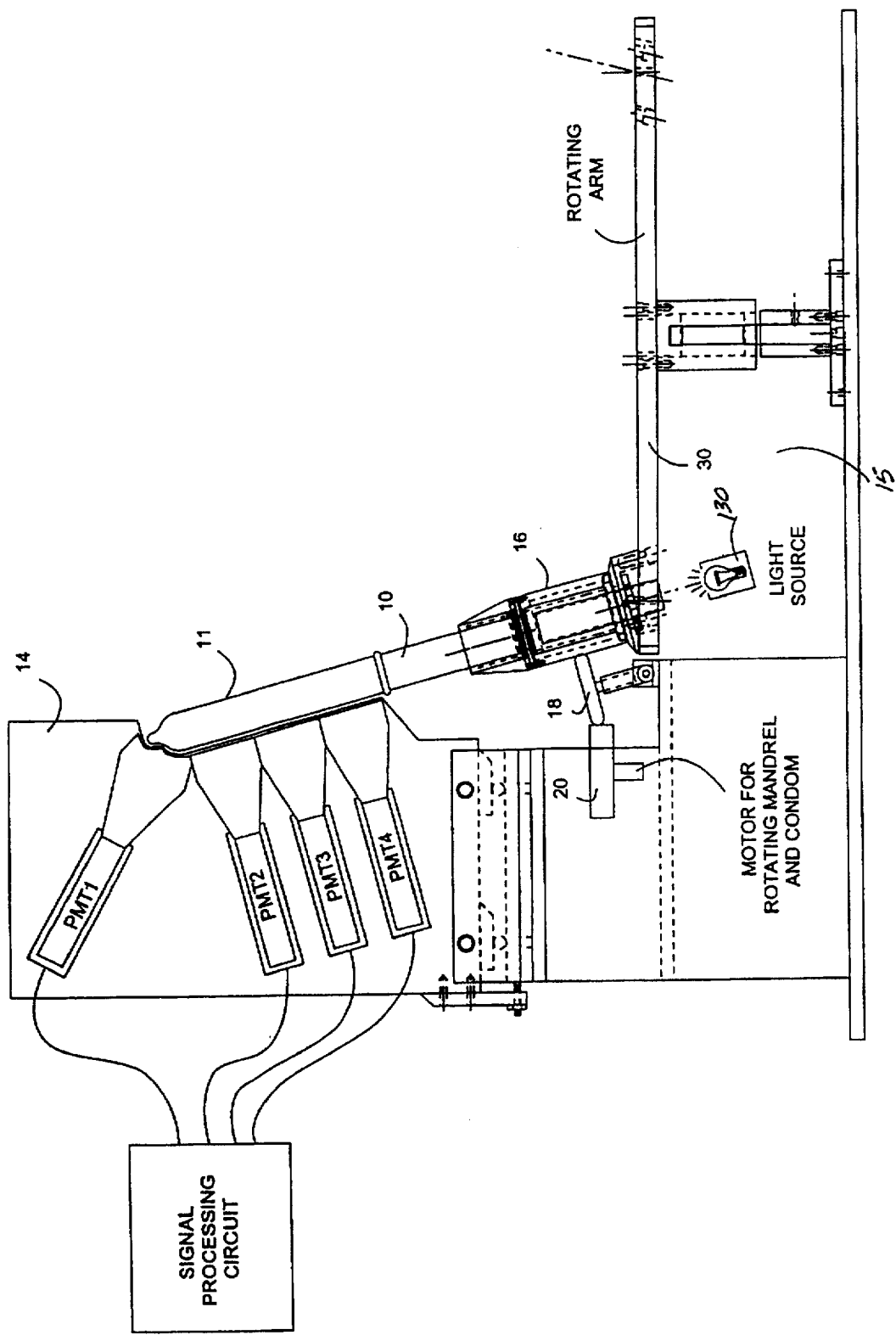
FIG. 13 is a simplified front view of a condom tester assembly in accordance with the invention.

In a fully-implemented scanning system, the vertical positioning of the optical system relative to the rotating mandrel may be accomplished automatically. Alternatively, the need for vertical movement of the photodetecting assembly (124, 128, 129) is eliminated in apparatus embodying the invention as shown in FIGS. 12, 13. In a preliminary test setup, with a FOV being, for example, 1 mm wide and 4 mm high, and at a given rotation rate, the vertical scan speed was limited to 20 or 30 mm/second. This required a full-condom scan time of between 5 and 10 seconds. Higher rotation rates, modified optical systems, and parallel measurement stations enable this time to be reduced to the 1 or 2 seconds required for production line applications. In fact, systems in accordance with FIGS. 11-19, discussed below, enable testing of a condom in fractions of a second.

In order to provide both a calibrated pinhole size and a realistic background of condom transmission, commercially-available precision pinholes which are laser-burned in metal foil discs were mounted behind small holes cut in the side wall of the condom. A circumferential scan around the condom at the height of the pinhole then simulates a real condom defect both in signal level and in background intensity.

Figure 2:
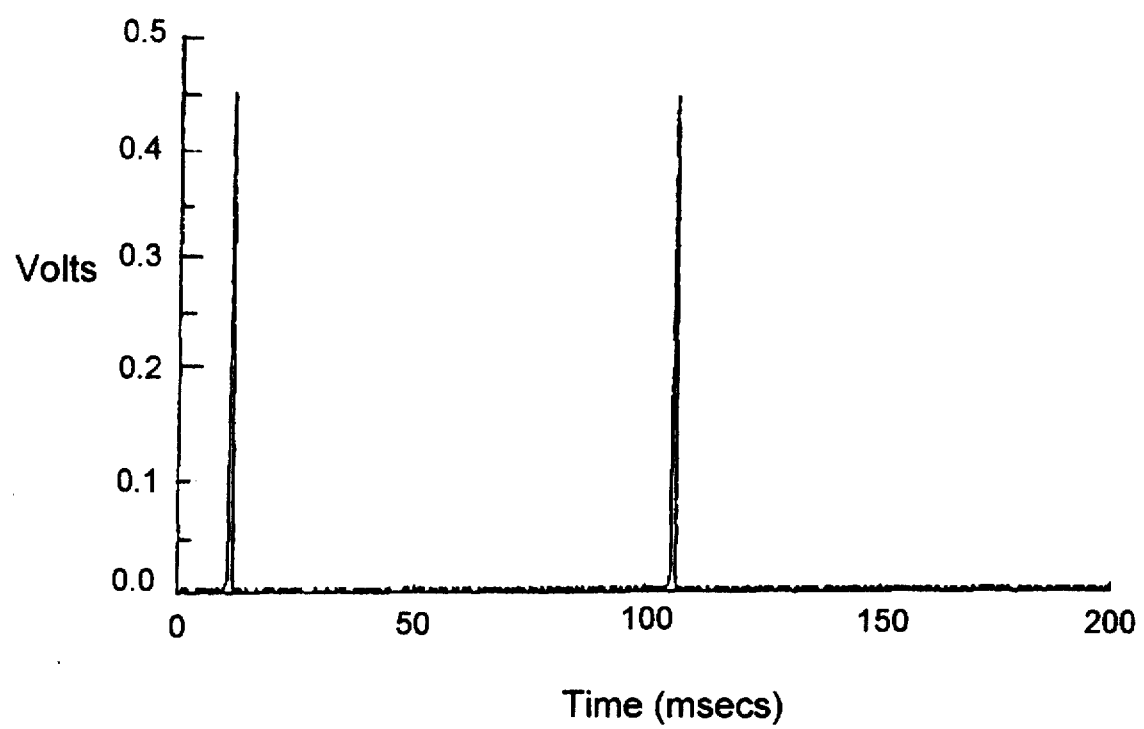
FIG. 2 is a graph of an output signal resulting from scanning across a 25 micrometer diameter precision pinhole in a latex condom with a 254 nanometer (nm) light source.

FIG. 2 shows the trace obtained using 254 nm light radiation with a 25 micrometer diameter pinhole. The strong signal peak occurs once every 100 milliseconds, which was the period of rotation of the mandrel. The detector aperture was 2 mm horizontally by 6 mm vertically. Background signals from both condom transmission and electronic sources are negligible, as may be observed from the figure.

Figure 3:
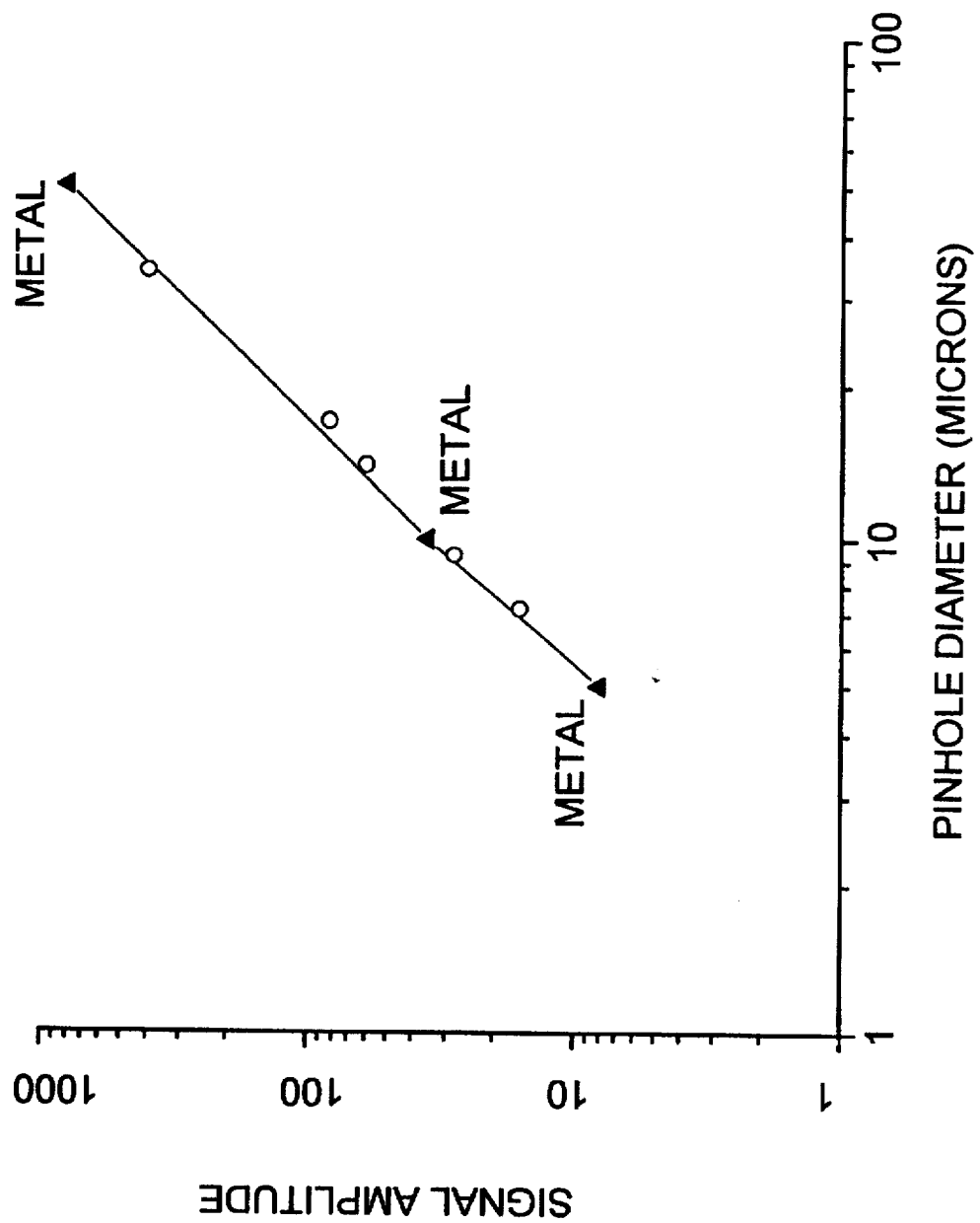
FIG. 3 is a graph of signal amplitude as a function of pinhole diameter.

The pinhole detection instrumentation may be calibrated using several known diameter pinholes in metal foil. Peak Signal data for 5, 10 and 50 micron diameter pinhole are plotted in FIG. 3, showing the expected linear increase in signal with pinhole area. These data serve to confirm Applicants' recognition that the amplitude of a photomultiplier signal corresponding to a pinhole is a means of measuring the area of a detected pinhole.

Figure 4:
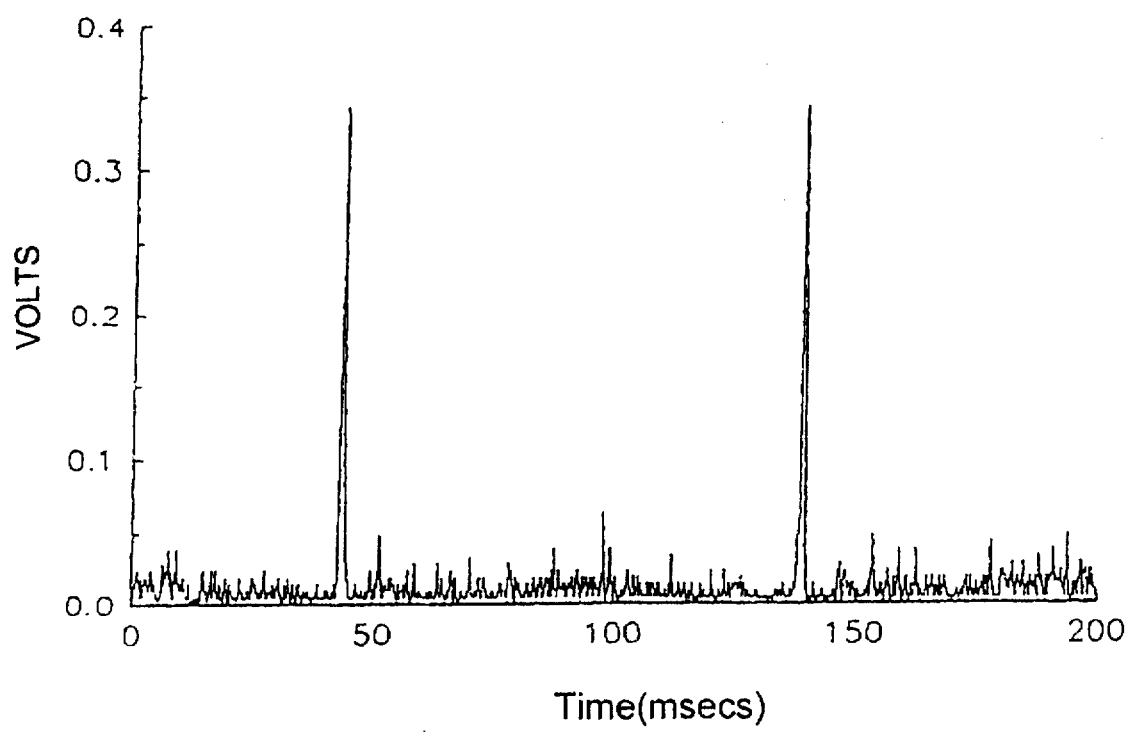
FIG. 4 is a graph of an output signal resulting from scanning across a 3 micron diameter precision pinhole in a latex condom with a 254 nm light source.

FIG. 4 shows a trace made with 254 nm light illuminating a 3 micron diameter pinhole in a condom. The light intensity of the received signal was decreased by a factor of 70 from the value of the signal received with a 25 micrometer diameter pinhole, due to the ratio of areas. The gain of the PMT 124 was increased by approximately this factor in order to compensate for the lower signal. At the higher gain, the light transmitted diffusely through the walls of the condom is visible between the pinhole peaks, but does not prevent a clear detection of even this small pinhole. It is evident from this result that optical systems improvements and modest signal processing can further reduce the minimum detectable pinhole size. Electronic noise from the detector, preamplifier, and sampling system was approximately a factor of 10 lower than the pinhole signal and is not a limiting factor.

Figure 5:
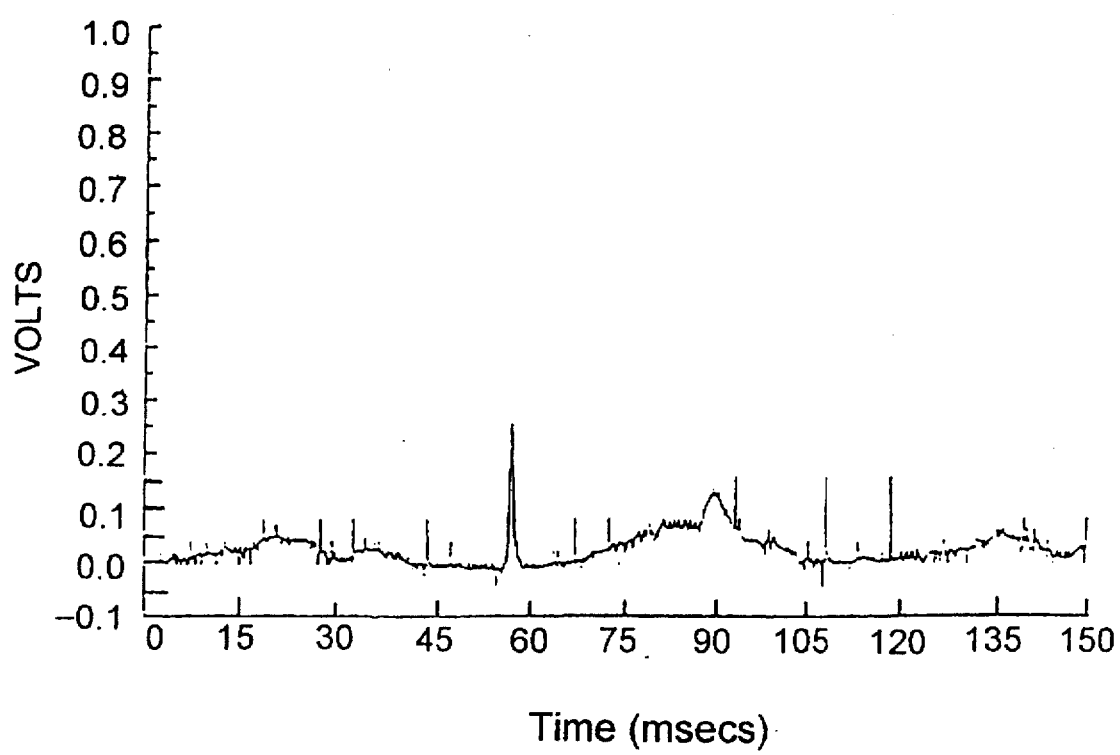
FIG. 5 is a graph of an output signal resulting from scanning across an artificially produced pinhole in a latex condom with a 254 nm light source.

FIG. 5 is a trace made with a condom having a known pinhole defect, rather than with a metal pinhole. The data of FIG. 5 were taken with an aperture setting which allowed a relatively high level of transmitted light to be detected by the PMT 124. As a result, the trace shows more clearly the slow changes due to wall thickness variations than does FIG. 4.

Figure 6:
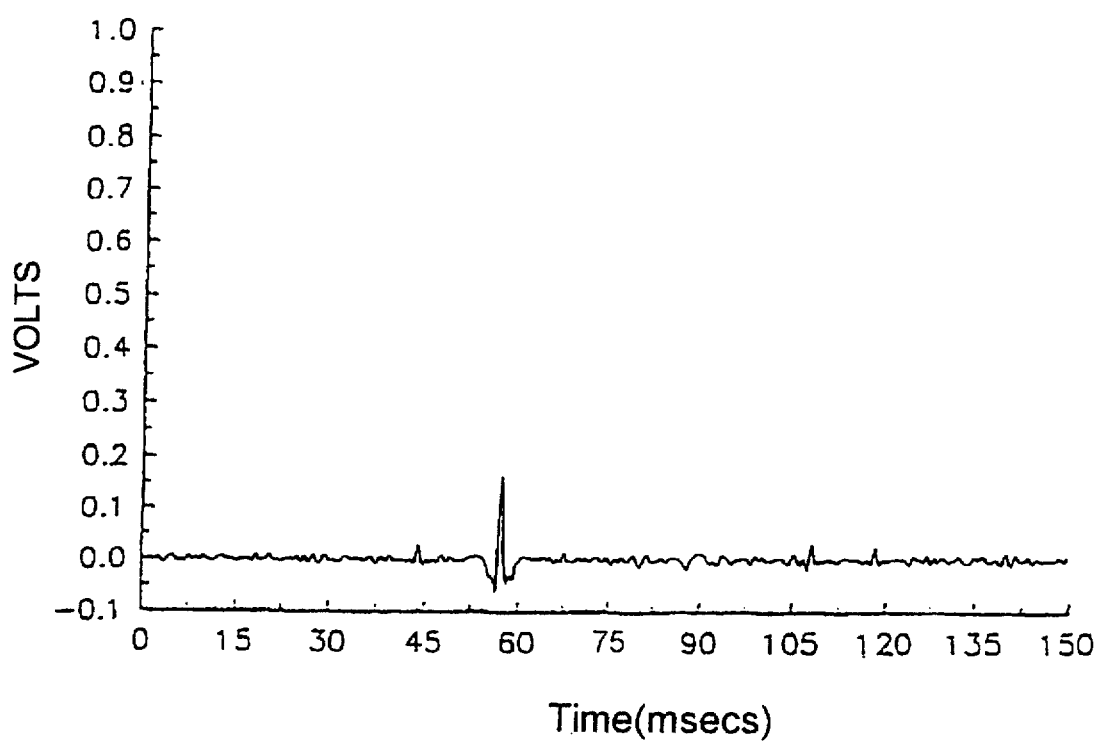
FIG. 6 is a graph of the signal shown in FIG. 5 following digital filtering.

The signal shown in FIG. 5 may be digitally processed. FIG. 6 shows the effect of digitally processing the signal shown in FIG. 5 with a 350 to 750 Hz bandpass filter to reduce the signal diffusely transmitted through the walls of the condom without decreasing the ability to distinguish the peak produced by the pinhole.

FIGS. 4 through 6 show that the optical pinhole detection system used by apparatus embodying the invention provide excellent signal-to-noise ratios with pinholes of only a few micrometers in diameter. The system also offers the advantage of providing precise information on the location of a defect.

The diffusely transmitted light visible between the pinhole signal peaks in FIGS. 4 and 5 vary in intensity with changes in the local thickness of the condom wall. This transmitted light can then be used, in principle, to make a scanning measurement of wall thickness. Such a measurement may be used to provide detailed information useful in controlling and improving the manufacturing process itself and to reject defective products in extreme cases.

Figure 7:
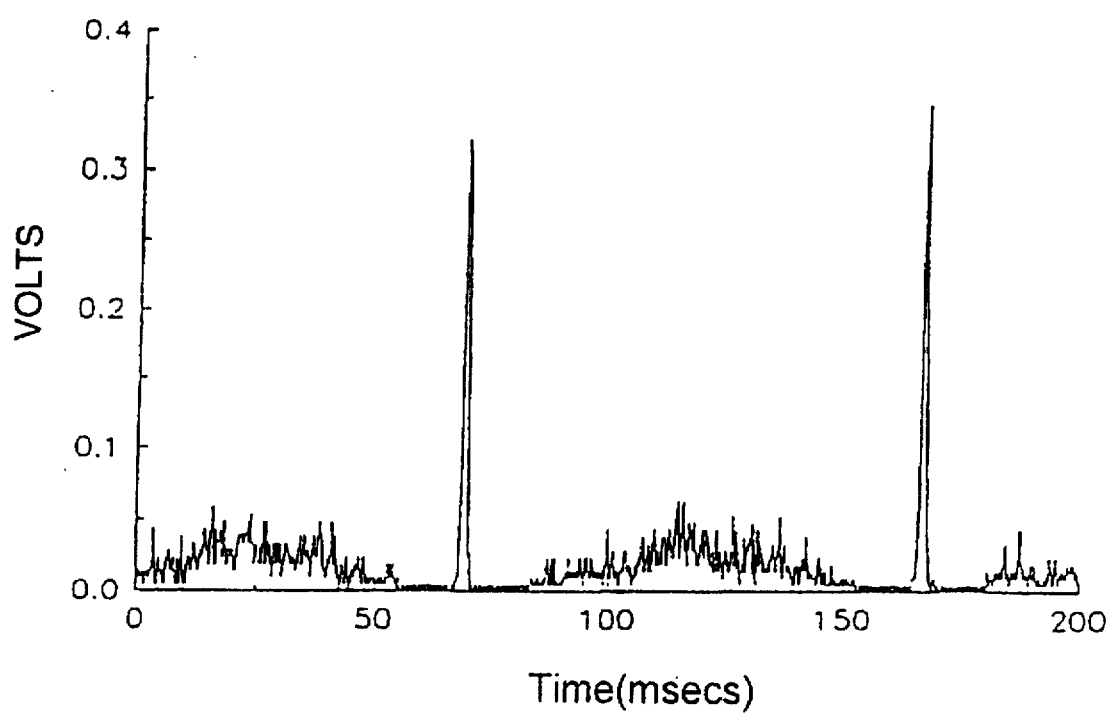
FIG. 7 is a graph showing the signal produced with a 3 micron diameter precision hole and signals resulting from light transmitted diffusely through the condom wall with a 254 nm light source.

FIG. 7 shows a circumferential scan around a condom. An opaque region was generated by covering a portion of the circumference with aluminum foil. The trace confirms that the signal represents transmitted light, and not electronic noise. The trace then provides a measure of local variations in latex thickness. FIG. 7 is a scan of a latex condom with a 3-micrometer diameter precision pinhole and an opaque region, using 254 nm illumination. The opaque region extends approximately 10 msec to the left of the pinhole peak, and 15 msec to the right. Noise in the region of diffusely-transmitted signal is caused by photon statistical effects at the extremely low light levels transmitted through the condom at 254 nm.

With 254 nm light, as was used in FIGS. 2–7, the transmission of diffused light through the latex wall is extremely low. If it were not so, the pinhole measurement could not succeed. However, the extremely noisy signal in the region between the pinholes is a result of the low level of transmitted light. Also, the low transmission implies that variations in latex thickness may produce orders-of-magnitude changes in signal levels, which could require excessive dynamic range in a detection system.

For purpose of thickness measurements (as opposed to pinhole detection), the optical techniques may work better at intermediate wavelengths, where the latex attenuation is not as high as it is at 254 nm. The mercury lamp 120 used in the scanning system shown in FIG. 1 can emit radiation not only at 254 nm, but also at 313 nm. Lamp 120 of FIG. 1 can thus be controlled to emit light of a longer wavelength.

Figure 8:
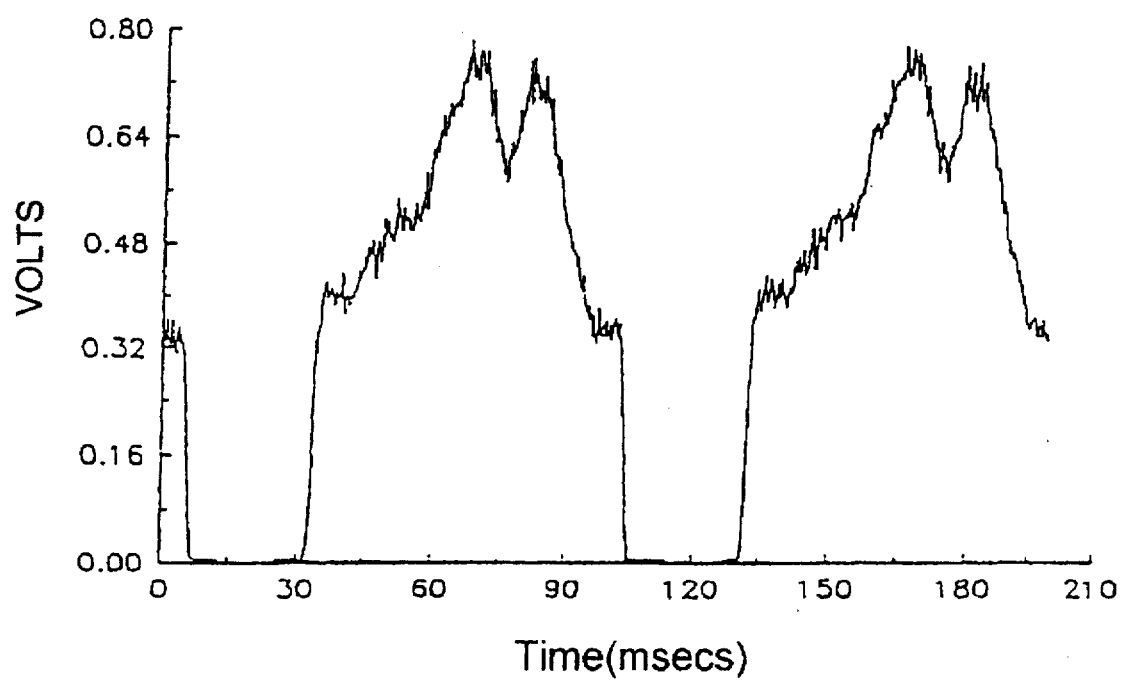
FIG. 8 is a graph showing the signal resulting from light transmitted diffusely through the walls of a latex condom with an opaque region using a 313 nm light source.

FIG. 8 shows a thickness transmission scan taken at 313 nm, using the same opaque region as in FIG. 7. With the higher level of transmitted light, the photon noise has been substantially reduced. The shape of the transmitted light signal reflects variations in the latex wall thickness around the circumference of the condom. No pinhole is present, since the diffusely transmitted light would have swamped the pinhole signal. As expected, signal levels are much higher than at 254 nm. Even without the use of signal processing algorithms to smooth the data, etc., the signal-to-noise ration is quite high.

FIG. 8 clearly demonstrates the feasibility of a scanning thickness measurement. Such a thickness measurement system may share the mechanical scan mechanisms, light source, and control elements of a pinhole detection system; whereby scanning for thickness variations may be accomplished at very little additional cost.

Also of interest are measurements to be made for purposes of process control in the latex dipping stages of manufacture, rather than for detection of defective final product. These measurements may be made on the factory floor, at the latex dipping or curing-oven stages. They may average over larger areas of the side wall, need not scan the tip regions at all, and may be carried out on-line with the condom still on the dipping mandrel.

Applicants have made optical transmission measurements which show the potential to address this process-control need. The measurements use infrared, rather than UV, light, and, as a result, are amenable to use with condoms mounted on current glass production mandrels which attenuate ultraviolet (UV) light considerably.

Figure 9:
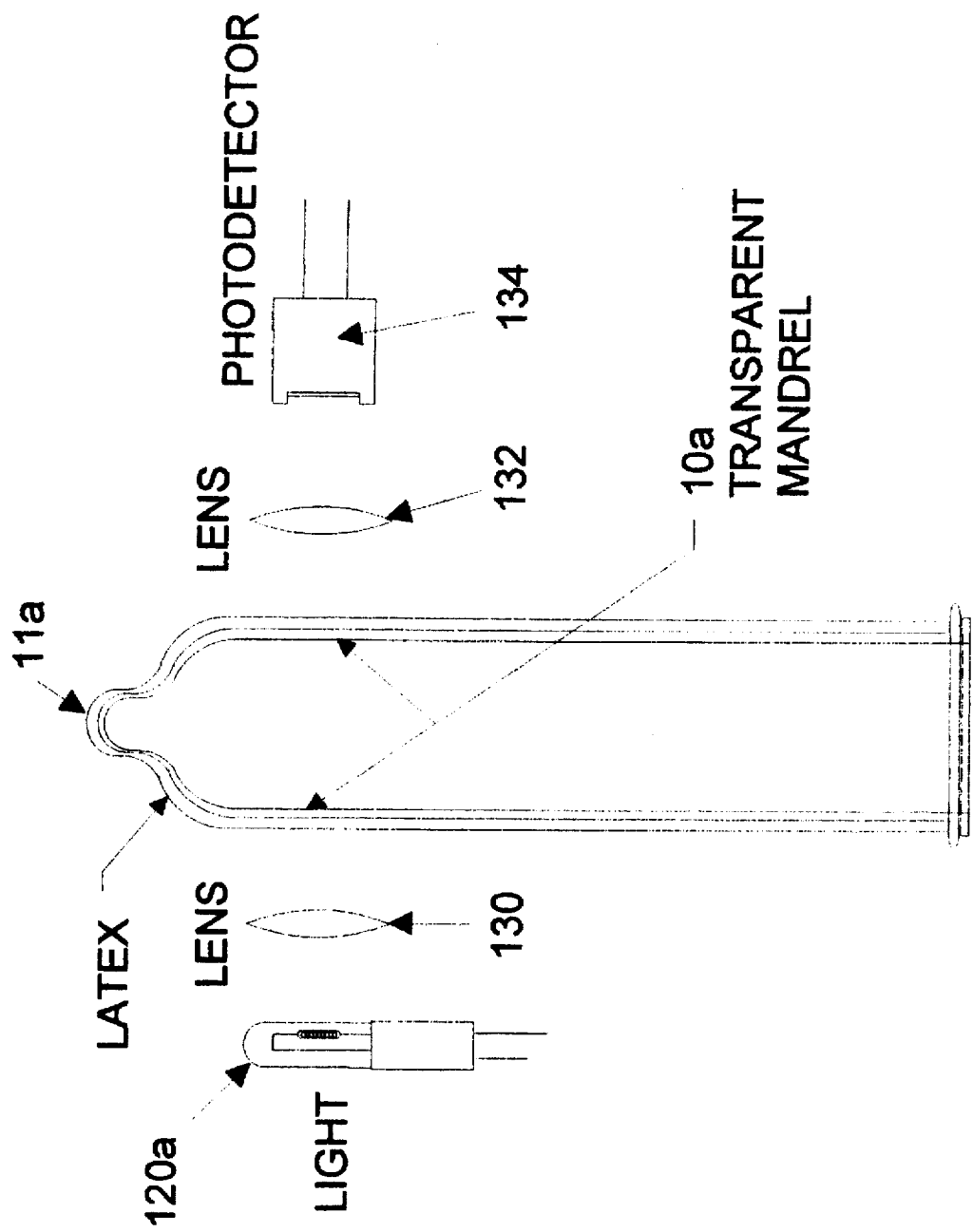
FIG. 9 is a diagram of an infrared (IR) test system configuration for measuring thickness of the latex condom material.

A system for making transmission measurements is shown in FIG. 9. In FIG. 9, a wide-band IR light source 120a is imaged by quartz optics 130 to the center of a condom mandrel 10a over which there is mounted a latex condom 11a to be tested. The light passing through the condom covered mandrel is then projected via lens system 132 onto an Indium Arsenide solid-state detector diode 134. In one embodiment, the region illuminated by the infrared beam as it passed through each layer of the condom was approximately 1.5 square centimeters. Interference filters were used to select various wavelengths from 3.0 to 3.4 microns.

Figure 10:
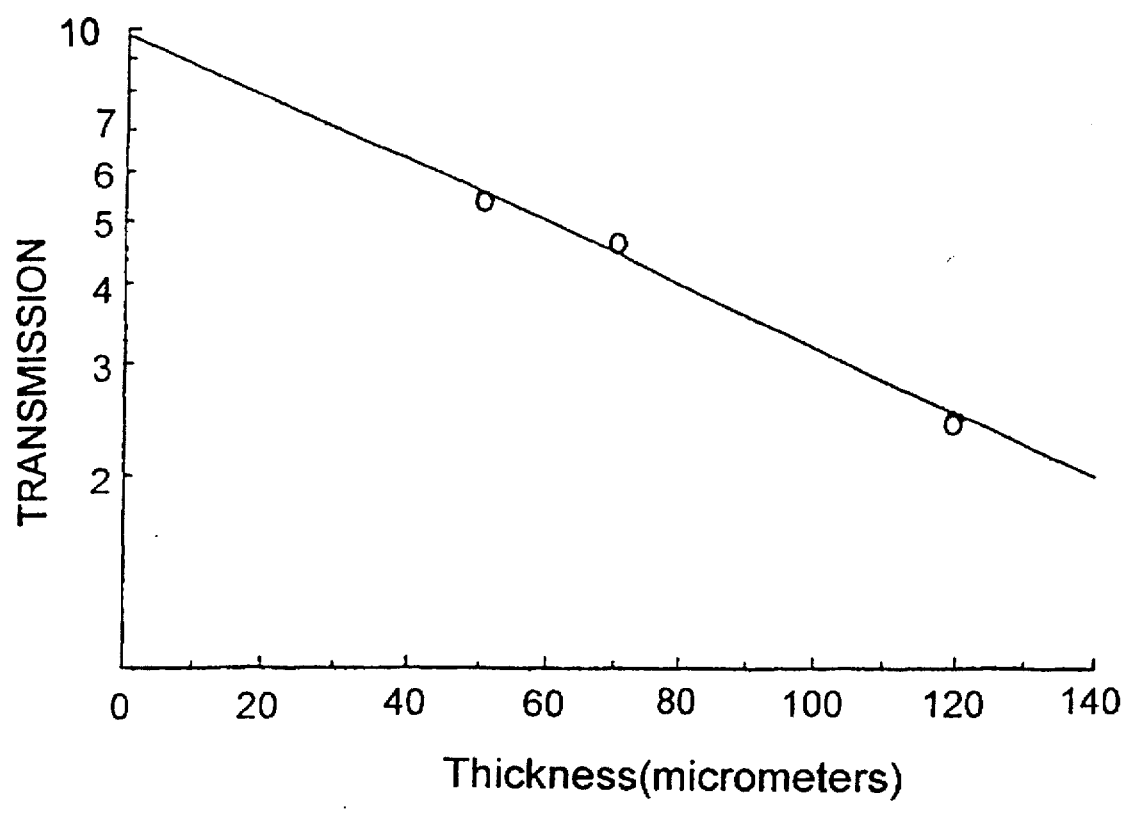
FIG. 10 is a graph showing the light transmission properties of latex condom material as a function of thickness.

Over the range of wavelengths explored, the optical transmission of a typical latex condom sheet was found to lie between 20 and 50 percent. The combination of two layers, one on each side of the mandrel, transmitted a reasonably strong IR signal. Even without any signal processing, the thickness determinations could be made with a precision of perhaps 3%. FIG. 10 shows a graph of transmission versus latex thickness, which demonstrates the expected exponential decrease. Applicants recognized that this phenomenon may be used to measure thickness of condoms during their manufacture.

Initial measurements were taken using fused-silica mandrels, which transmit nearly 100% of the incident IR and UV radiation. Measurements on several glass production mandrels show that the transmission of the mandrels themselves is in the range of 25% (both walls included), and that an adequate signal for measurement is still transmitted. With some concern for mandrel consistency, and perhaps a calibration of the optical transmission of production mandrels, an IR measurement of thickness may be made on current dipping mandrels, with minimal investment required. Where calibration is a problem, IR or UV-transmitting mandrels may be substituted for some or all of the standard production mandrels.

The IR optical control measurement may include a scanning capability if needed, and may be configured to have an instantaneous FOV between a square millimeter and a square centimeter. The simplest thickness measuring system need not rotate or scan the condom. It would be sufficient to have static measurement at two or three points along the side wall. In any event, it should be appreciated that the systems to measure pinholes, discussed herein, may also be used to measure thickness with appropriate change in the wavelength of the light source.

Figure 11A:
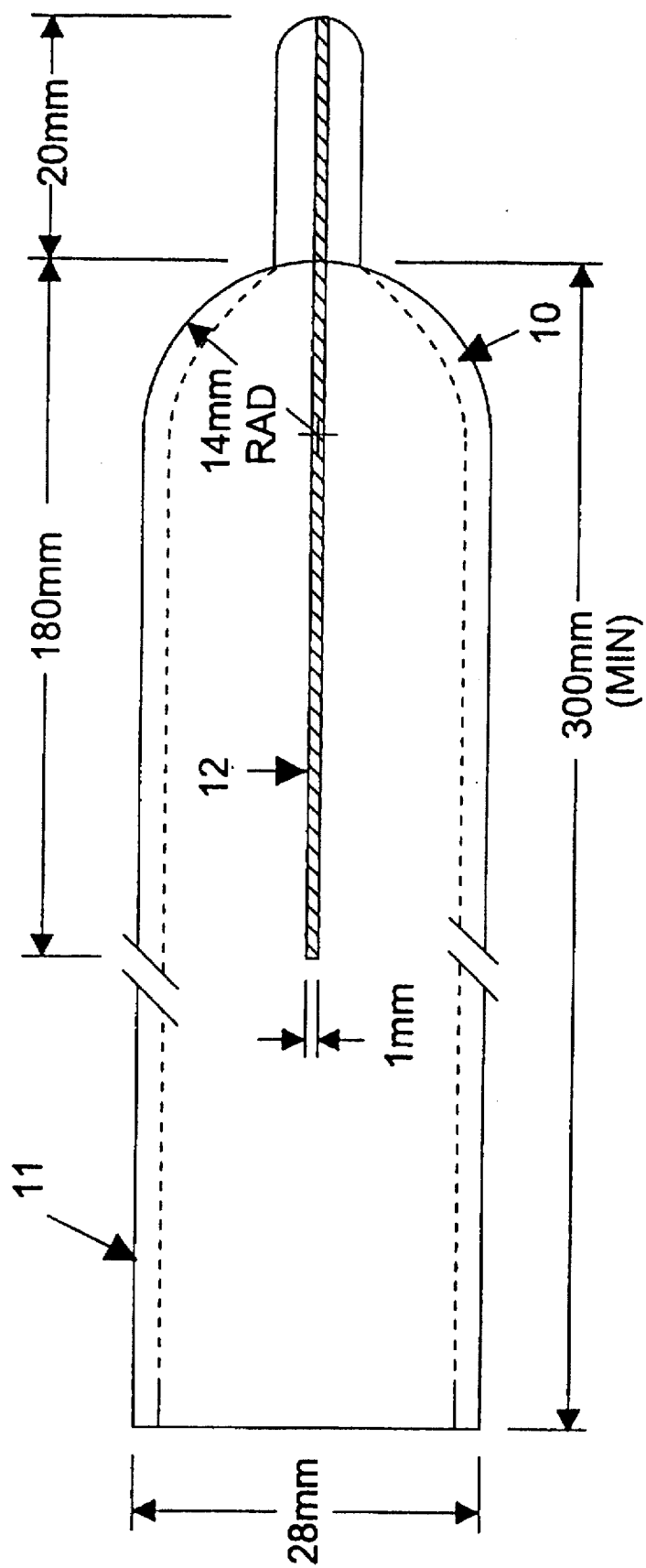

FIG. 11A shows a transparent mandrel 10 over which a condom 11 to be inspected is to be mounted (unrolled). The condom, when mounted (unrolled), is stretched and distended over the mandrel whose diameter is greater than that of the "deflated" condom.

Located within the mandrel 10 is a fiber optic light probe 12 formed from a bundle of optical fibers. The light probe 12 is shaped to form an elongated narrow beam of light extending along the top surface of the mandrel (See FIG. 11B) and down from the top surface (See FIG. 11A) along the length of the mandrel for a distance which may range from 1 to 7 inches (e.g., the full length of the mandrel). The length of the light source line may be made shorter or longer depending on the length of the condom surface it is desired to illuminate during the test condition.

Thus, in the embodiment shown in FIGS. 11A, 11B and 11C, the light source is formed from a bundle of optical fibers shaped to provide a line of light inside the mandrel 10 and extending along a selected length thereof. The line of light is projected perpendicularly to the cylindrical wall portion of the mandrel surface nearest to the light emitting portion of the optical fiber termination.

The light receiving portion of the bundle of optical fibers terminates at the bottom end as shown in FIG. 11C. An appropriate light source illuminates the light receiving portion of the fiber optic bundle which then distributes the light along the top and side of the mandrel 10, as discussed above.

The light source is preferably a source of ultraviolet (UV) light. However, for some tests, as discussed herein, the light source may be a source of infrared (IR) light. To conduct tests to reveal the presence of pinholes, the wavelength of the light source is selected to have a value for which the material of the article being tested is opaque. For material thickness tests, the wavelength of the light source would be adjusted to provide a predetermined transmission through the walls of the article.

Instead of an optical fiber light probe, the light source could be an array of light emitting diodes (LED) whose light output would be optically projected via an optical system comprised of one or more lenses along the top and side of the mandrel.

In one system embodying the invention and illustrated in FIGS. 12 and 13, a fiber optic probe and/or the line of light projected along the inside wall of the mandrel is fixed (stationary) while the mandrel carrying a condom to be tested is designed to rotate about the light source whereby the entire top and cylindrical surface of the condom will be illuminated for each full rotation of the condom.

FIG. 12 shows a detector configuration for use with a light source located inside the mandrel. FIG. 12 shows four (4) photo multiplier tubes (PMT1, PMT2, PMT3, PMT4) located to sense light received across the top and along the side of the mandrel opposite the location of the line source of light. The photomultiplier tubes (PMT1, PMT2, PMT3, PMT4) are fixedly mounted, with each PMT sensing a different section of the line, except in the areas of overlap. The use of four PMTs enables the system to identify more precisely the defective section of the condom being tested.

FIG. 13 shows a condom 11 distended over a transparent mandrel 10 which is mounted on a mandrel holding structure 16 located on a rotatable test table 30. A light source 130 may be located within the base section 15 located below the rotating holding structure 16 with the light output from light source 130 projecting upward and into a fiber optic bundle (not shown) located within mandrel 10. The mandrel holding structure 16 is coupled via a coupler 18 to a motor 20 which causes, and controls, the rotation of the mandrel 10. The motor 20 and coupler 18 may also be used to index the position of the condom as it rotates. Hence, whenever one of the photo multiplier tubes (PMTs) indicates the presence of a defect, the location of the defect is ascertainable by noting which PMT indicates a fault and where the fault is reported along the rotation of the mandrel.

To limit the field of view of the PMTs to a narrow line segment, a shield 14 used to form a rectangular slit is located between the photomultiplier assembly and the mandrel carrying the condom to be tested.

Figure 14:
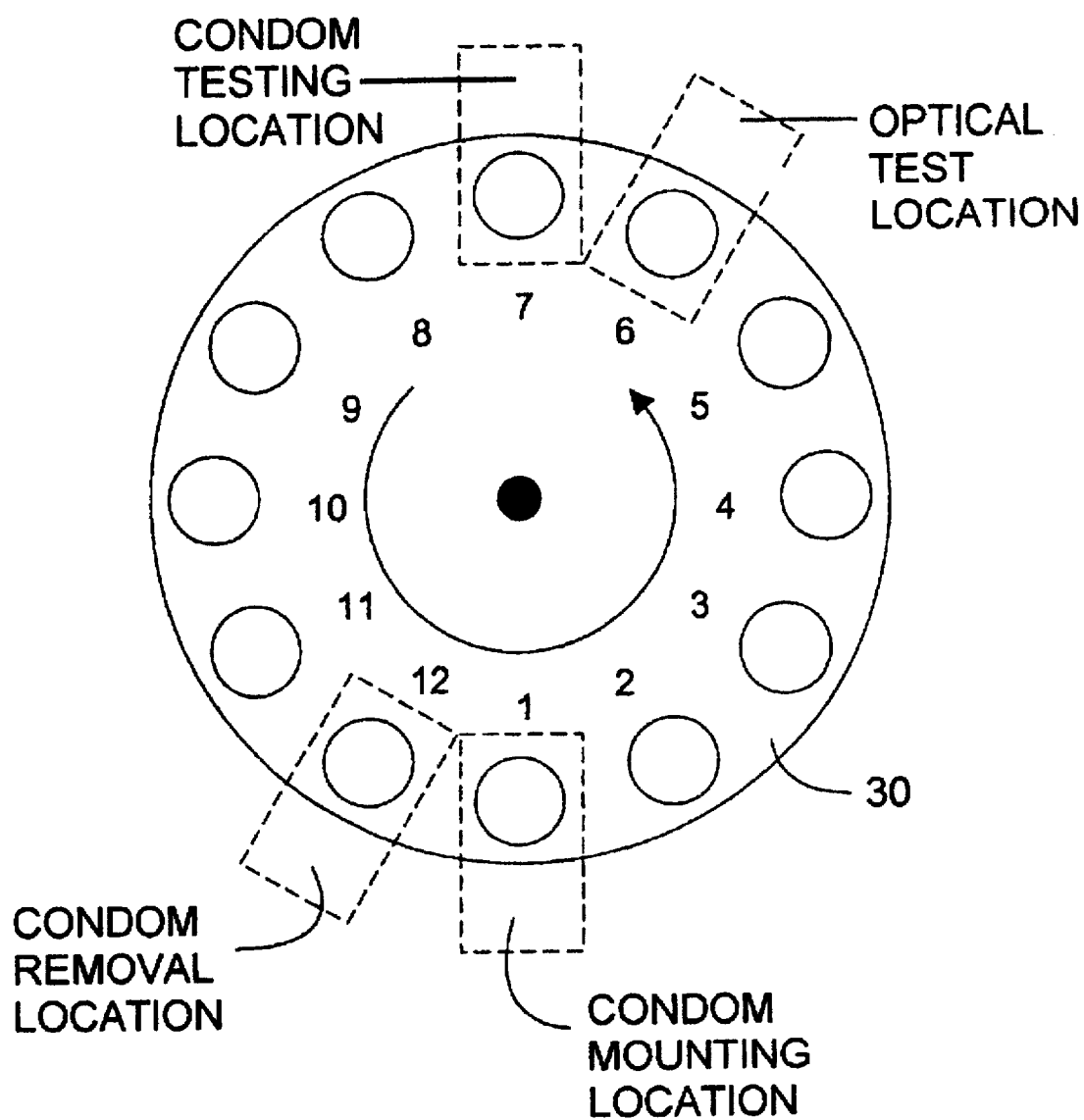
FIG. 14 is a simplified layout of an optical testing station in accordance with the invention.
Figure 15A:
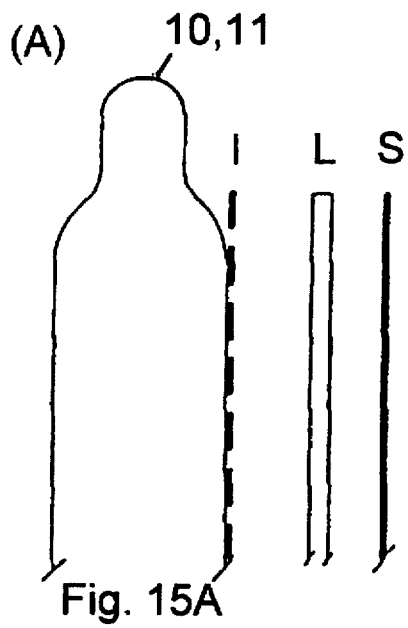
FIG. 15 $(a)$, $(b)$, $(c)$, $(d)$ is a simplified representation of the location of lenses for imaging a condom being tested.
Figure 15B:
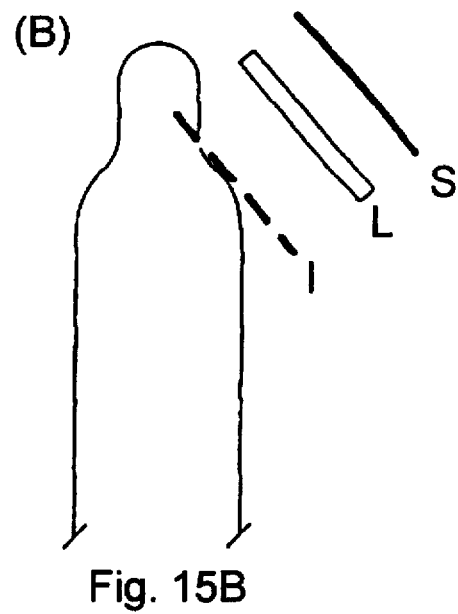
Figure 15C:
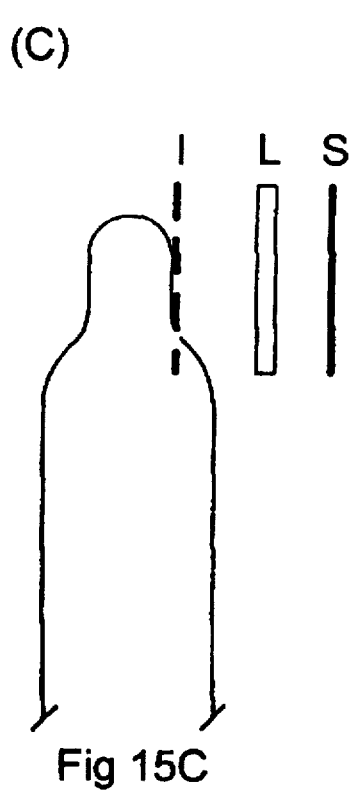
Figure 15D:
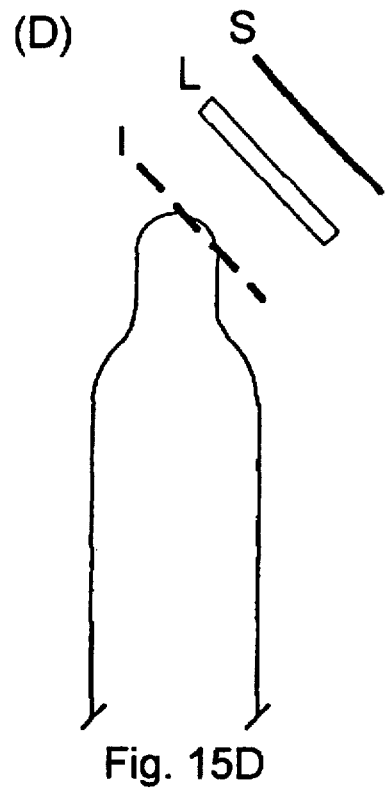

FIG. 14 shows a circular, rotatable test table 30 on which up to 12 mandrels may be mounted at any one time. By way of example, a condom to be tested would be mounted on a mandrel at position 1. The actual testing of the condom takes place when the mandrel reaches position 7 which is the condom testing location. At this location, the light would be projected via the fiber optic light probe and the motor/coupler combination would cause the condom mounted mandrel to rotate while the photo multiplier tubes would sense the amount of light passing through the wall of the condom. Note that additional or other tests may be performed at different locations as indicated for location 6 in FIG. 14.

Referring to FIG. 13, positioned on, or adjacent to, shield 14 there may be included a series of cylindrical lenses disposed along the length of the shield and opposite the line source of light to direct light from the various portions of the line source onto respective photo multiplier tubes, as shown in FIGS. 15a, 15b, 15c and 15d.

Figure 16:
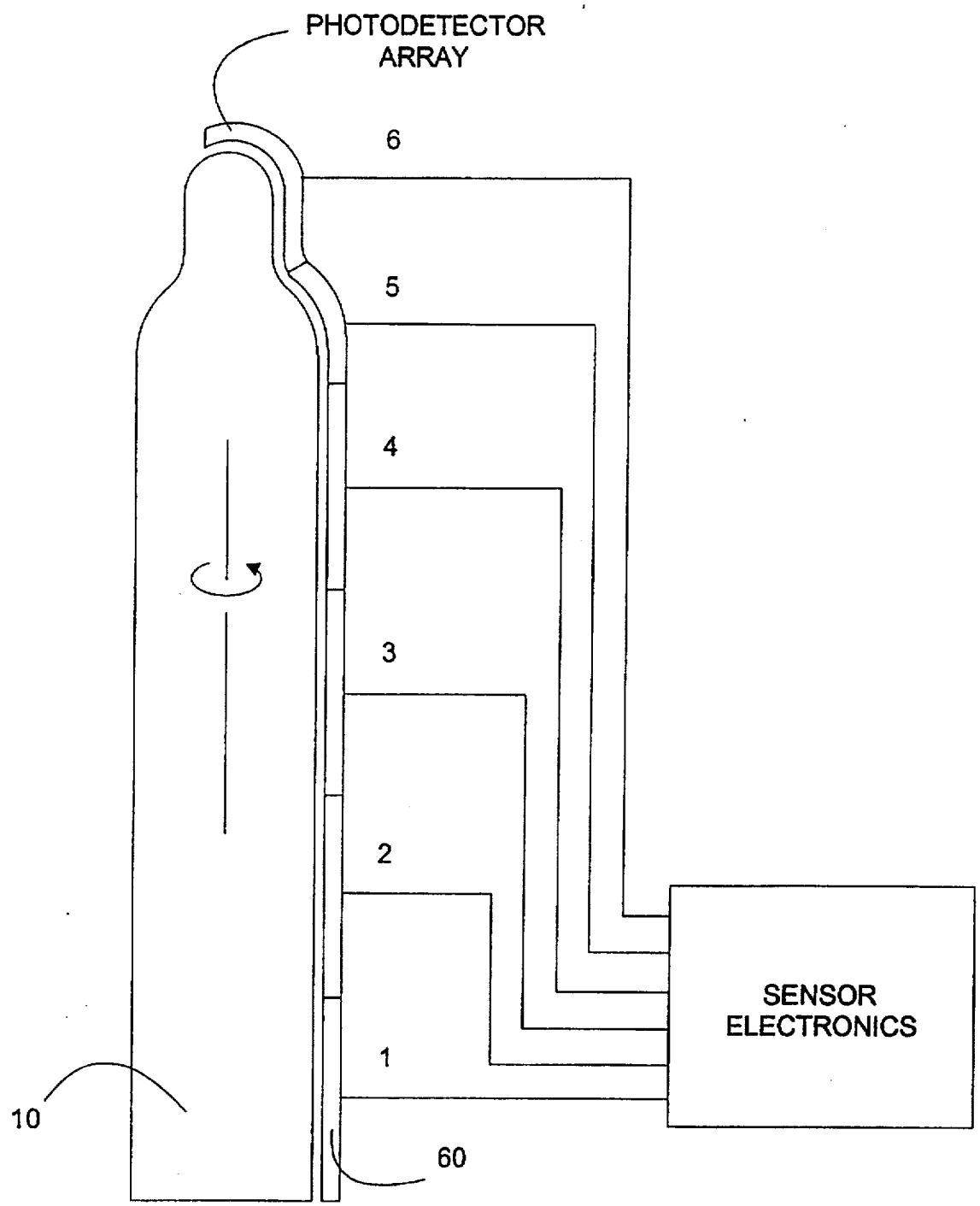
FIG. 16 is a diagram illustrating the use of a solid state photodetector array to sense the light passing through a condom being tested.

FIG. 16 illustrates that, instead of photomultiplier tubes, a linear array 60 of photosensing devices such as a charge coupled device (CCD) array or an array of photodiodes or phototransistors can be used to sense light passing through the walls of the condom. The photodetector of FIG. 16 may be used to very precisely determine the location of any defect.

Figure 17:
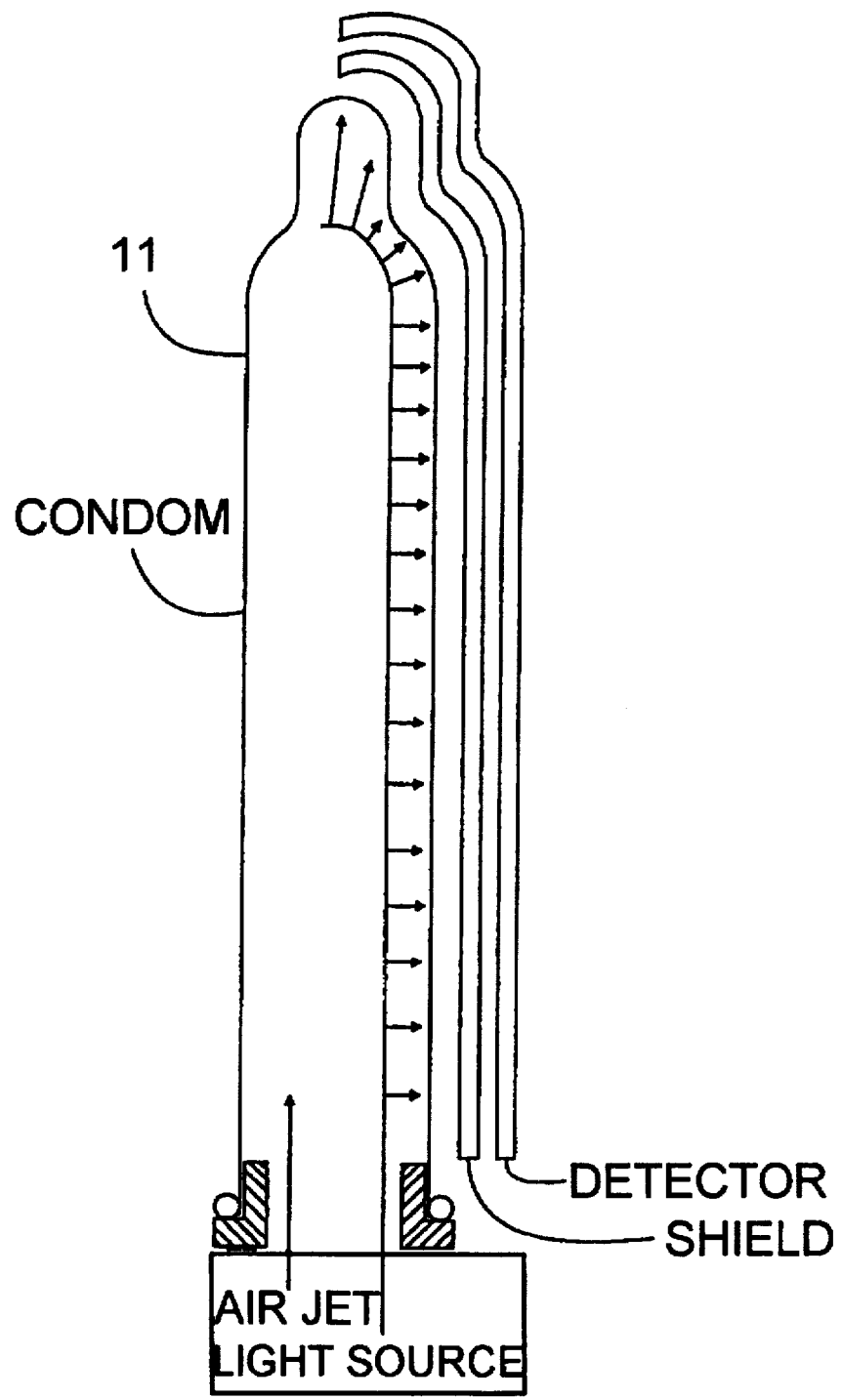
FIG. 17 illustrates the testing of a condom which is distended and inflated by an appropriate gas.

The transparent mandrel 10 provides rigid support for condoms to be tested. However, as shown in FIG. 17 a condom can be tested by mounting it over an opening and blowing a jet of air, or a like gas, into the condom. That is, a gas which is transparent at the wavelengths of light used to illuminate the condom can be used to inflate the condom and cause it to have a desired height and diameter and to be sufficiently rigid to be electro-optically tested. A line of light can be projected inside the condom to illuminate a line along the top of the condom and a line along the cylindrical (or wall) portion of the condom for a predetermined length. The system for projecting light against the internal wall of the condom and the photo sensing mechanism may be the same as for the case of the transparent mandrel. The mechanism for rotating the disc on which the condom is mounted can be similar to that used to drive the transparent mandrel, as discussed above.

Figure 18:
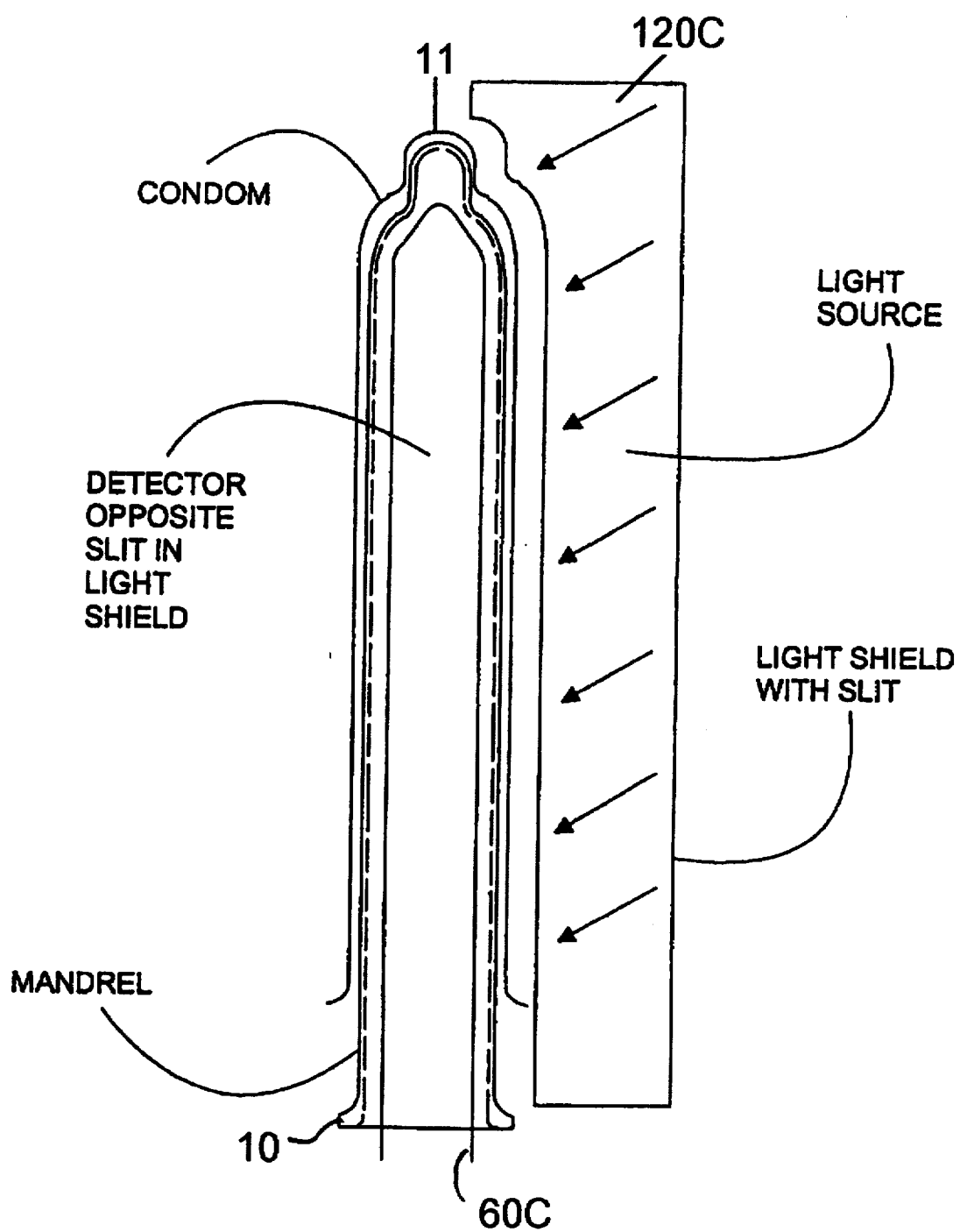
FIG. 18 illustrates a light source illuminating the outer surface of a condom and a photodetector located within the mandrel.

In FIGS. 1–8 and in FIGS. 11–17 the light source is used to illuminate the inner surface, or wall, of the condom and the photosensor is located externally to the condom. However the light source may be located external to the condom for illuminating its outer surface and the photosensing means may be located inside the condom so as to sense the light passing through the wall of the condom from the outer surface to the inner surface. This is illustrated in FIG. 18 which shows a source of light 120C with a light shield and slit positioned externally to the condom 11 mounted on a mandrel 10 with the light projecting in a generally perpendicular direction onto the condom. A photodetector 60C is located internal to the mandrel and opposite the incoming light to sense the light passing from the outer surface to the inner wall. Thus, as shown in FIG. 18, the light source may be projected onto the outer wall or surface of the condom and the photosensor can be located facing the inner surface to sense the amount of light passing from the outer surface through the condom wall.

Figure 19:
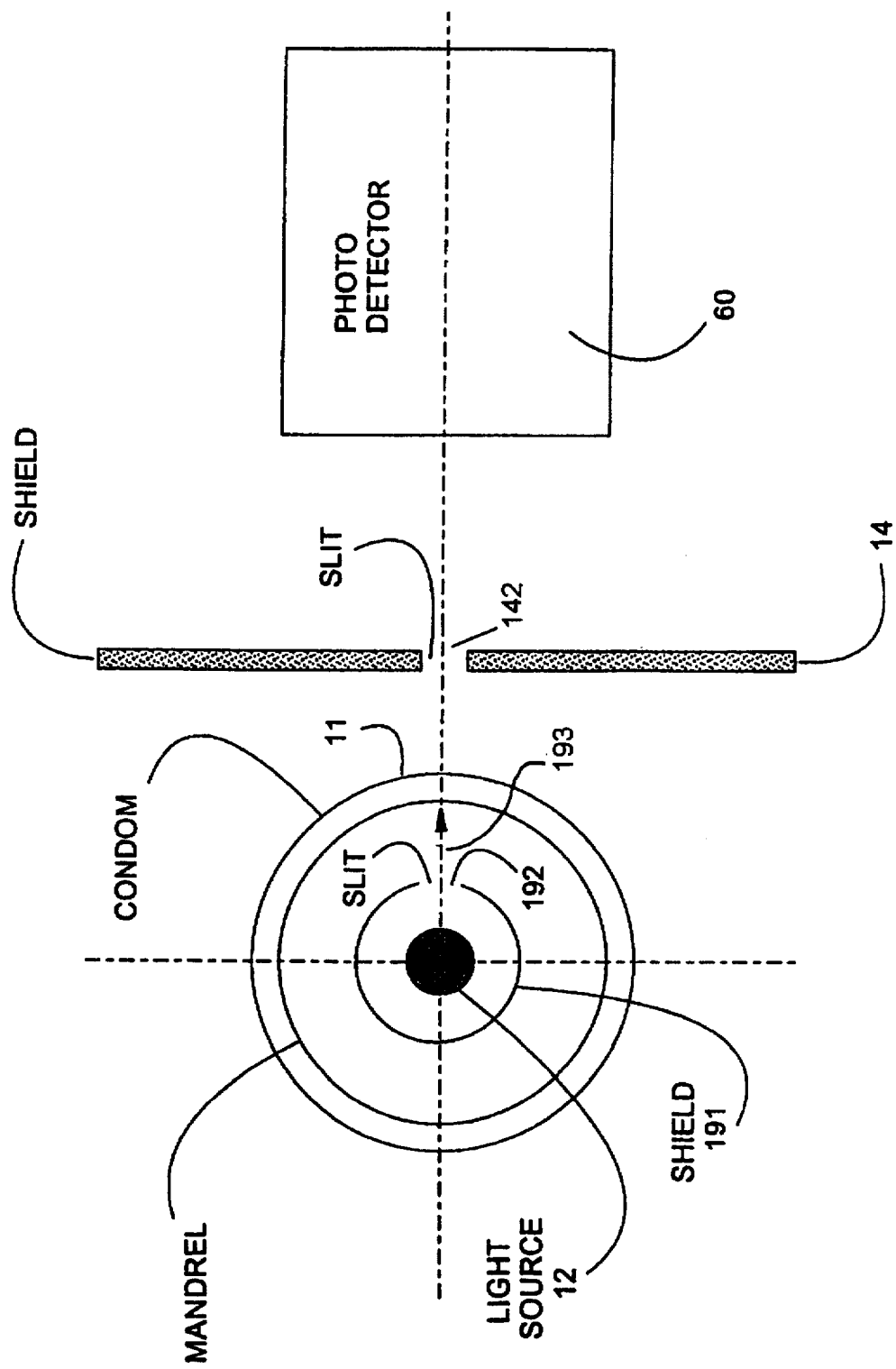
FIG. 19 illustrates the use of two slits, one slit to limit the narrowness of the light beam incident on the condom being tested and the other slit to limit the field of view of the detector.

FIG. 19 illustrates the use of a light shield 191 formed with a narrow slit 192 around a light source 12 to generate a very narrow beam of light 193 incident on a condom 11 to be tested. The light shield also limits the total amount of light which impinges on the condom to ensure that the light does not adversely affect the condom. The shield 14 also has a slit 142 to limit the field of view (FOV) of the photodetector and functions in the same manner as previously described.

The invention has been illustrated using condoms. However, it should be evident that apparatus embodying the invention may be modified to inspect many different types of elastic products such as surgical gloves and like objects.

It should also be noted that, with some modification, the equipment discussed above may be used to test (or examine) for the presence of embedded particles in the latex of the condom wall, or similar imperfections. During such testing, visible light is projected onto the wall of the condom being examined; e.g., light source 12 in FIG. 19 would be made a source of visible light. The photodetector, e.g., detector 60, shown in FIGS. 16, 19, which may be a high resolution imaging line scan CCD detector, is then set to detect gray spots viewed against the diffuse white appearance of the condom wall. The scanning of the light across the condom and the rotation of the light or the condom about each other is accomplished as discussed above to provide useful testing and results. Thus, in testing for embedded particles, a light source of visible light is used to illuminate the product to be tested and a photosensor senses any change in the amount of light passing through the walls of the product.

What is claimed is:

1. Apparatus for testing an elastic product comprising:
   means for distending the elastic product and causing it to assume a shape having continuously closed sides and a closed top end and an open bottom end, with the elastic product having an inner surface and outer surface;
   a source of light and means responsive to said source of light for projecting a line of light along one of said inner and outer surfaces of the elastic product, said light source having particular wavelength at which the material of the elastic product is relatively opaque;
   means for scanning the line of light across the entire portion of the surface of the elastic product to be tested; and
   photo sensing means, responsive to said particular wavelength, positioned relative to the line of light and the elastic product for sensing any light from the line of light passing through the elastic product and ascertaining the amount of light passing through the elastic product.

2. The apparatus as claimed in claim 1 wherein said elastic product is a condom having a tubular shape.

3. The apparatus as claimed in claim 2 wherein said means for distending the condom is a transparent mandrel made of a material which is transparent to the wavelength of the source of light, and wherein the condom is mounted over the mandrel.

4. The apparatus as claimed in claim 2 wherein said means for distending the condom is a mandrel made of fused silica, and wherein the condom is mounted over the mandrel.

5. The apparatus as claimed in claim 2 wherein said means for projecting a line of light includes means for projecting the light along the inner surface of the condom.

6. The apparatus as claimed in claim 5 wherein said means for projecting a line of light along the inner surface of the condom includes a fiber optic light probe.

7. The apparatus as claimed in claim 6 wherein said photo sensing means includes a light shield and a photodetecting means located externally to the condom, with the light shield having a rectangular slit and being located between the outer surface of the condom and the photodetecting means for limiting the field of view of the photodetecting means.

8. The apparatus as claimed in claim 6 wherein said photo sensing means includes a linear array of photodetecting elements disposed along the length of the outer surface of the condom for enabling the determination of the location of holes in the condom.

9. The apparatus as claimed in claim 2 wherein said means for distending the condom includes means for inflating the condom.

10. The apparatus as claimed in claim 9 wherein said means for inflating the condom includes means for supplying a jet of air into the open bottom end of the condom.

11. An apparatus as claimed in claim 2 wherein said means for projecting a line of light includes means for projecting the line of light along the outer surface of the condom; and
    wherein said photo sensing means is located to sense the light passing from the outer surface to the inner surface of the condom.

12. An apparatus as claimed in claim 2 wherein the wavelength of said source of light may be varied for enabling the determination of the thickness of the condom wall.

13. An apparatus as claimed in claim 2 wherein the source of light and the photo sensing means are held stationary; and
    wherein said means for scanning the line of light across the entire portion of the condom surface to be tested includes means for rotating the condom between the light source and the photo sensing means.

14. A method for testing the integrity of an elastic product, having a tubular shape with a closed end and an open end, comprising the steps of:
    illuminating the elastic product with a line of light having a particular wavelength at which the elastic material, if not defective, is relatively opaque;
    sensing the amount of light passing through the surface of the elastic product with photodetector means responsive to said particular wavelength; and
    rotating the elastic product between the line of light and the photodetector for sensing the light passing through the entire closed end surface of the elastic product.

15. A method as claimed in claim 14 wherein the elastic product is a condom.

16. Apparatus for testing a condom comprising:
    means for distending the condom and for stretching it to a predetermined height and diameter and thereby defining its inner and outer surface; said condom formed of a material which is opaque at a particular wavelength;
    means for projecting a beam of light having said particular wavelength along the inner surface of the condom;
    photosensing means, located adjacent to the outer surface of said condom, responsive to said particular wavelength of the beam of light for sensing the presence of light of said selected wavelength passing from the inner surface to the outer surface of said condom; and means for causing the beam of light to be scanned across the entire portion of the surface of said condom to be tested.

17. The apparatus as claimed in claim 16 wherein said means for distending the condom is a mandrel which is transparent to the wavelength of the beam of light, and wherein the condom is mounted on the surface of the mandrel.

18. The apparatus as claimed in claim 17 wherein said means for projecting a beam of light along the inner surface of the condom includes means for projecting a thin line of light along a predetermined length of the condom.

19. The apparatus as claimed in claim 18 wherein said means for projecting a line of light along the length of the condom includes a fiber optic probe.

20. The apparatus as claimed in claim 19 wherein said photosensing means includes a linear array of photodetecting elements disposed along the length of the outer surface of the condom for enabling the determination of the location of any hole in the condom.

21. The apparatus as claimed in claim 16 wherein said photosensing means includes a plurality of photo multiplier tubes disposed to sense light passing through the condom along a line, each photo multiplier for sensing a different portion of the line.

22. The apparatus as claimed in claim 16 wherein said photosensing means includes means for detecting the amount of light passing through the condom and means for detecting the presence of any pinholes in the condom.

23. The apparatus as claimed in claim 16 wherein the light projecting means and the photo sensing means are stationary and the condom is rotated between them.

24. Apparatus for testing an elastic product comprising:
means for distending the elastic product and causing it to assume a shape having continuously closed sides and a closed top end and an open bottom end, with the elastic product having an inner surface and outer surface;
a source of light and means responsive to said source of light for projecting a line of light along one of said inner and outer surfaces of the elastic product;
means for scanning the line of light across the entire portion of the surface of the elastic product to be tested;
photo sensing means, responsive to said light, positioned relative to the line of light and the elastic product for sensing any variation in the amount of light passing through the elastic product; and
wherein said means for distending the elastic product is a transparent mandrel made of a material which is transparent to the wavelength of the source of light, and wherein the elastic product is mounted over the mandrel.

25. The apparatus as claimed in claim 24 wherein said elastic product is a condom having a tubular shape.

26. The apparatus as claimed in claim 25 wherein said means for distending the condom is a mandrel made of fused silica, and wherein the condom is mounted over the mandrel.

27. The apparatus as claimed in claim 25 wherein said means for projecting a line of light includes means for projecting the light along the inner surface of the condom.

28. The apparatus as claimed in claim 27 wherein said means for projecting a line of light along the inner surface of the condom includes a fiber optic light probe.

29. The apparatus as claimed in claim 28 wherein said elastic product is a condom, and wherein said photo sensing means includes a linear array of photodetecting elements disposed along the length of the outer surface of the condom for enabling the determination of the location of any defect in the condom.

30. The apparatus as claimed in claim 29 wherein said elastic product is a condom, and wherein said means for inflating the condom includes means for supplying a jet of air into the open bottom end of the condom.

31. An apparatus as claimed in claim 25 wherein said means for projecting a line of light includes means for projecting the line of light along the outer surface of the condom; and
wherein said photo sensing means is located to sense the light passing from the outer surface to the inner surface of the condom.

32. An apparatus as claimed in claim 25 wherein the source of light and the photo sensing means are held stationary; and
wherein said means for scanning the line of light across the entire portion of the condom surface to be tested includes means for rotating the condom between the light source and the photo sensing means.

33. A method for testing the integrity of an elastic product, having a tubular shape with a closed end and an open end, comprising the steps of:
illuminating the elastic product with a line of light having a particular wavelength at which the material of the elastic product being tested is relatively opaque;
sensing the amount of light passing through the surface of the elastic product with photodetector means responsive to said particular wavelength; and
rotating the elastic product between the line of light and the photodetector for sensing any change in the amount of light passing through the entire closed end surface of the elastic product.

34. A method as claimed in claim 33 wherein the elastic product is a condom.

35. Apparatus for testing an elastic product comprising:
means for distending the elastic product and causing it to assume a shape having continuously closed sides and a closed top end and an open bottom end, with the elastic product having an inner surface and outer surface;
a source of light and means responsive to said source of light for projecting a line of light along one of said inner and outer surfaces of the elastic product;
means for scanning the line of light across the entire portion of the surface of the elastic product to be tested; and
photo sensing means, responsive to said light, positioned relative to the line of light and the elastic product for sensing any variation in the amount of light passing through the elastic product;
wherein said photo sensing means includes a light shield and a photodetecting means located externally to the elastic product, with the light shield having a rectangular slit and being located between the outer surface of the elastic product and the photodetecting means for limiting the field of view of the photodetecting means.

36. Apparatus for testing an elastic product comprising:
means for distending the elastic product and causing it to assume a shape having continuously closed sides and a closed top end and an open bottom end, with the elastic product having an inner surface and outer surface;

a source of light and means responsive to said source of light for projecting a line of light along one of said inner and outer surfaces of the elastic product;

means for scanning the line of light across the entire portion of the surface of the elastic product to be tested;

photo sensing means, responsive to said light, positioned relative to the line of light and the elastic product for sensing any variation in the amount of light passing through the elastic product; and wherein said means for distending the elastic product includes means for inflating the condom.

* * * * *